United States Patent [19]
Isakson

[11] Patent Number: 5,911,569
[45] Date of Patent: Jun. 15, 1999

[54] ICE FISHING HOLE COVER AND INDICATOR

[76] Inventor: Eric Isakson, 703 South Lewis St., Shakopee, Minn. 55379

[21] Appl. No.: 09/019,314

[22] Filed: Feb. 6, 1998

[51] Int. Cl.[6] ............................. A01K 85/01; A01K 97/10
[52] U.S. Cl. .................................................. 43/17; 43/21.2
[58] Field of Search ................... 43/17, 4, 21.2, 43/15, 16

[56] References Cited

U.S. PATENT DOCUMENTS

| | | | |
|---|---|---|---|
| 253,456 | 2/1882 | Whitcomb | 43/17 |
| D. 311,499 | 10/1990 | Mason | D10/104 |
| D. 317,195 | 5/1991 | Hackel | D22/134 |
| D. 336,507 | 6/1993 | Werner | D22/134 |
| 885,627 | 4/1908 | Loehr | 43/17 |
| 2,901,855 | 9/1959 | Todd | 43/17 |
| 3,170,458 | 2/1965 | Anderlie | 43/17 |
| 3,603,019 | 9/1971 | Smeltzer | 43/21.2 |
| 3,660,923 | 5/1972 | Johnson | 43/17 |
| 3,694,950 | 10/1972 | Maier | 43/4 |
| 3,745,689 | 7/1973 | Williams | 43/17 |
| 4,021,958 | 5/1977 | Snodie | 43/17 |
| 4,048,742 | 9/1977 | Clingan | 43/4 |
| 4,120,111 | 10/1978 | Young, Jr. | 43/17 |
| 4,146,988 | 4/1979 | Bednarczyk | 43/17 |
| 4,285,154 | 8/1981 | Grahl | 43/17 |
| 4,310,983 | 1/1982 | Irvin et al. | 43/17 |
| 4,522,572 | 6/1985 | Hahn | 43/16 |
| 4,565,024 | 1/1986 | Maerz | 43/17 |
| 4,567,686 | 2/1986 | Akom | 43/17 |
| 4,662,099 | 5/1987 | Stewart | 43/17 |
| 4,685,240 | 8/1987 | Fralick | 43/17 |
| 4,704,816 | 11/1987 | Kuchar | 43/17 |
| 4,727,673 | 3/1988 | Dumar | 43/17 |
| 4,787,166 | 11/1988 | Vogt et al. | 43/17 |
| 4,805,336 | 2/1989 | Heyerman | 43/17 |
| 4,823,494 | 4/1989 | Waterman | 43/17 |
| 4,837,965 | 6/1989 | True | 43/17 |
| 4,845,878 | 7/1989 | Hackel | 43/17 |
| 4,845,881 | 7/1989 | Ward | 43/21.2 |
| 4,862,627 | 9/1989 | Keller | 43/17 |
| 4,907,363 | 3/1990 | Dury | 43/15 |
| 4,980,986 | 1/1991 | Harper | 43/17 |
| 5,005,310 | 4/1991 | Rinehart | 43/17 |
| 5,035,074 | 7/1991 | Tylkowski | 43/24 |
| 5,048,220 | 9/1991 | Harris | 43/4 |
| 5,068,995 | 12/1991 | Rinehart | 43/17 |
| 5,074,072 | 12/1991 | Serocki et al. | 43/17 |
| 5,152,093 | 10/1992 | Bartys | 43/17 |
| 5,163,243 | 11/1992 | Wold, Jr. et al. | 43/17 |
| 5,269,087 | 12/1993 | Johnston | 43/4 |
| 5,274,944 | 1/1994 | Laessig | 43/17 |
| 5,363,583 | 11/1994 | Brunner | 43/17 |
| 5,448,850 | 9/1995 | Gonnello | 43/17 |

FOREIGN PATENT DOCUMENTS

| | | | |
|---|---|---|---|
| 1090571 | 12/1980 | Canada | 43/17 |
| 2434565 | 2/1975 | Germany | 43/17 |
| 3839168 | 8/1989 | Germany | 43/17 |
| 8300943 | 10/1984 | Netherlands | 43/17 |
| 94/15458 | 7/1994 | WIPO | 43/17 |

*Primary Examiner*—Kurt Rowan
*Assistant Examiner*—Frederick T. French, III
*Attorney, Agent, or Firm*—Palmatier, Sjoquist, Voigt & Christensen, P.A.

[57] ABSTRACT

The ice fishing hole cover and indicator generally includes a base having a pole engagement end which is adapted to hold a conventional ice fishing rod and reel. A cover end is positioned opposite to the pole engagement end which includes a catch. A trip latch is provided which is adapted for adjustable and releasable engagement to the catch. The trip latch is rotatably engaged to the cover indicator which, in turn, is pivotally engaged to the cover end of the base. A fishing line is engaged to the trip latch to release the indicator cover from the cover end for vertical positioning relative thereto upon the taking of the bait by a fish. The base and cover end are adapted to be placed over an ice fishing hole, preventing the freezing thereof during ice fishing activities. The indicator cover, upon release from the cover end, functions to advise a fisherman as to the existence of a fish on the fisherman's line.

18 Claims, 6 Drawing Sheets

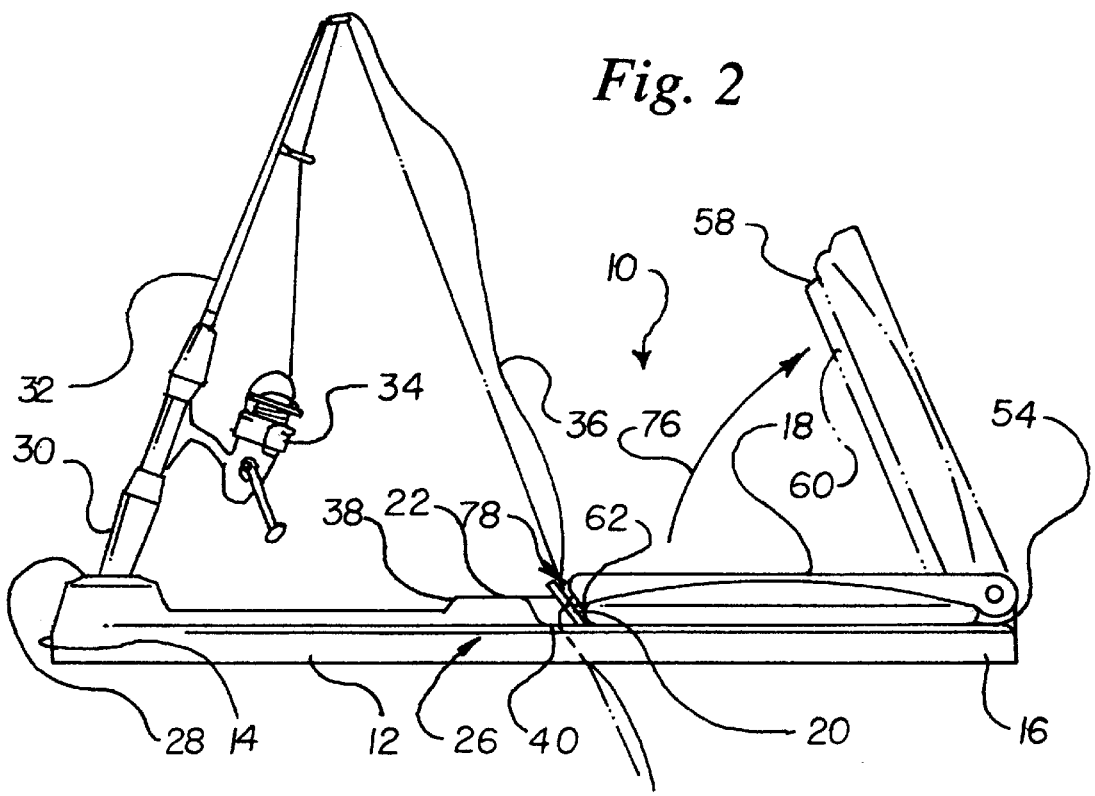
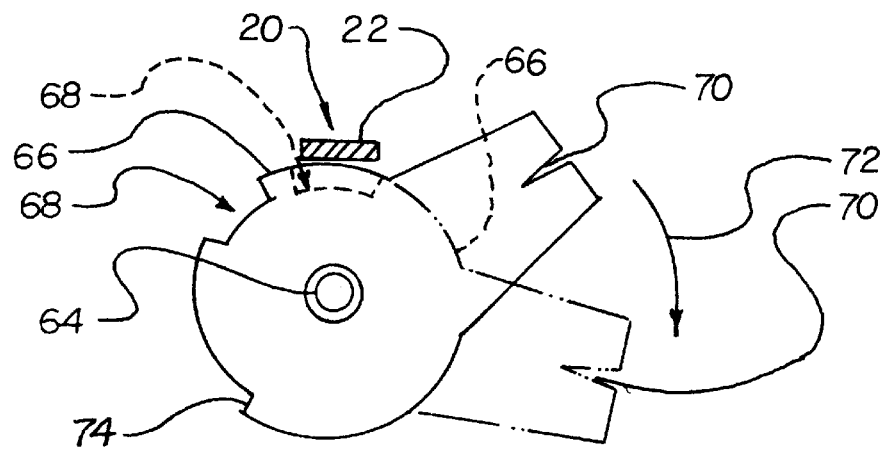

ICE FISHING HOLE COVER AND INDICATOR

BACKGROUND OF THE INVENTION

The present invention simultaneously relates to an ice fishing hole cover and indicator which preferably prevents the freezing of an ice fishing hole and indicates the existence of a fish on a fisherman's line during ice fishing activities.

In the past, ice fishing tip-up devices have been used by a fisherman to indicate the existence of a fish on a fisherman's line. The conventional ice fishing tip-up devices, as known, did not permit the utilization of a conventional ice fishing rod or reel. As such, a fisherman was required to manually lift the tip-up unit when a fish was on the line, grasp the line with a hand, set the hook, and use a hand-over-hand motion to pull the line and fish from the hole in the ice. Frequently, the line would then become tangled, or a fisherman's hands would become quite cold. In addition, the fisherman would not have the opportunity to take advantage of the mechanical drag features of a conventional fishing reel or the action of a desired type of rod when catching a fish. As such, a fisherman was thereby required to use heavier line than would otherwise have been selected if a rod and reel combination were available.

Another drawback of the conventional tip-up devices, as known, is that the conventional tip-up devices usually have a very small spool of line, which is, in essence, a line holder, and not a fishing reel. In these known devices, no mechanism existed permitting the use of a standard rod/reed combination which would enable the bail to remain open. As known, fish do not always swallow bait immediately upon a strike. In many instances, a fish sensing resistance on a fishing line may drop or let go of bait resulting in an uncaught fish. If a fish is permitted to freely draw bait and line, an increased probability is provided that the fish will swallow the bait and hook, resulting in a caught fish.

Still another drawback of the conventional tip-up devices is that the tip-up devices, as known, do not adequately cover a hole in the ice, thereby delaying the freezing of the ice fishing hole. Many known tip-up devices, in fact, fail to include a cover feature or are seated within the hole in the ice, or in such a proximity to the hole in the ice, that the tip-up device freeze into the ice surface, rendering the device useless.

Still another drawback of the conventional tip-up devices is the inability for a fisherman to jig bait once a conventional tip-up has been set. The movement of a conventional tip-up or line usually results in the tripping of the flag, requiring the device to be reset following each period of jigging activity.

Still another drawback of the conventional tip-up devices is that it is difficult and cumbersome for a fisherman to set the depth of bait due to the absence of a convenient method of holding the fishing line.

The invention described herein overcomes these identified and other problems related to the tip-up devices as known.

SUMMARY OF THE INVENTION

The ice fishing hole cover and indicator generally includes a base having a pole engagement end which is adapted to hold a conventional ice fishing rod and reel. A cover end is positioned opposite to the pole engagement end which includes a catch. A trip latch is provided which is adapted for adjustable and releasable engagement to the catch. The trip latch is rotatably engaged to the cover indicator which, in turn, is pivotally engaged to the cover end of the base. A fishing line is engaged to the trip latch to release the indicator cover from the cover end for vertical positioning relative thereto upon the taking of the bait by a fish. The base and cover end are adapted to be placed over an ice fishing hole, preventing the freezing thereof during ice fishing activities. The indicator cover, upon release from the cover end, functions to advise a fisherman as to the existence of a fish on the fisherman's line.

It is a principle object of the present invention to provide an ice fishing hole cover and indicator of relatively simple and inexpensive design, construction, and operation, which is safe, and which fulfills the intended purpose reliably without fear of injury to persons and/or damage to property.

It is another principle object of the present invention to provide an ice fishing hole cover and indicator which is used with a conventional ice fishing rod and reel.

Still another principle object of the present invention is to provide an ice fishing hole cover and indicator which delays the freezing of an ice fishing hole following drilling.

Still another principle object of the present invention is to provide an ice fishing hole cover and indicator which is not seated within an ice fishing hole and which does not itself freeze into the ice surface surrounding an ice fishing hole.

Still another principle object of the present invention is to permit a fisherman to jig a fishing line following the setting of the ice fishing hole cover and indicator without re-setting the device.

Still another principal object of the present invention is to enable a fisherman to adjustably set the tension of the trip latch while fishing for either larger or smaller fish.

Still another principal object of the present invention is to provide an ice fishing hole cover and indicator which is fast and easy to set up and use.

Still another principal object of the present invention is to enable a fisherman to select lighter line for use in the presentation of bait to fish, enabling the fisherman to rely on the drag and rod action of a conventional rod and reel combination.

Still other principal object of the present invention is to enable a fish to draw line following a strike, minimizing resistance while simultaneously opening a trip latch and indicator cover during fishing activities.

Still another principal object of the present invention is to provide an ice fishing hole cover and indicator which is easy to visualize following the tripping of the latch, signaling the existence of a fish on the fishing line.

Still another principal object of the present invention is to provide a fisherman with the ability to use the standard features of a rod and reel combination during fishing activities.

A feature of the present invention is a base having an ice hole cover end positioned immediately over an ice fishing hole.

Still another feature of the present invention is a base having a pole engagement end adapted to hold an ice fishing pole.

Still another feature of the present invention is a base having a catch which is adapted to releasably engage a trip latch, enabling an indicator cover to simultaneously minimize freezing of a hole in the ice while signaling a fisherman as to the existence of a fish on a line.

Still another feature of the present invention is an indicator cover having an affixation member which is preferably engaged to the ice hole cover end of the base providing upward pivotal motion of the indicator cover relative to the ice hole cover end, and providing access into the fishing hole while simultaneously signaling a fisherman as to the existence of a fish on a line.

Still another feature of the present invention is a fastener engaged to the indicator cover and to the trip latch, enabling rotation of the trip latch for releasing the indicator cover from the ice hole cover end of the base.

Still another feature of the present invention is the trip latch engaged to the fastener having a line slit which is adapted to releasably hold fishing line.

Still another feature of the present invention is an actuator engaged to both the cover end and to the indicator cover for urging the indicator cover to a vertical position upon release of the trip latch from the catch.

Still another feature of the present invention is a pole cup integral to the pole engagement end of the base.

Still another feature of the present invention is a release slot within the trip latch adapted to permit the indicator cover to be released from a catch.

Still another feature of the present invention is a base having a sloped ledge and a horizontal ledge having a line slot for positioning of a fishing line within an ice fishing hole.

BRIEF DESCRIPTION OF THE DRAWINGS

FIG. 2 is a side view of the ice fishing hole cover and indicator with ice fishing pole and reel;

FIG. 4 is a detail view of the trip latch;

DETAILED DESCRIPTION OF THE PREFERRED EMBODIMENT

Figure 1:
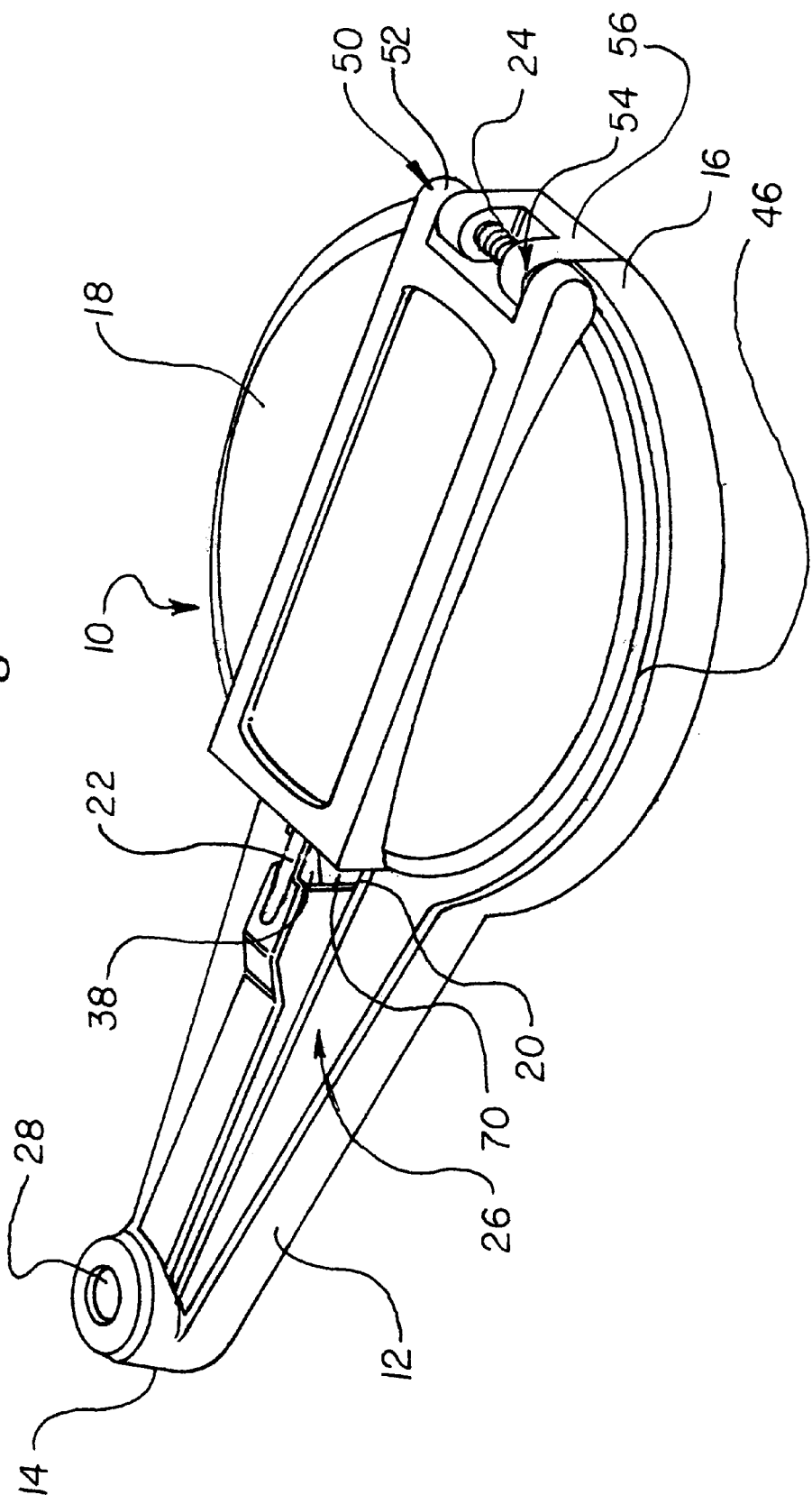
FIG. 1 is an isometric view of the ice fishing hole cover and indicator.

One form the invention is illustrated and described herein. In general, the ice fishing hole cover and indicator is indicated by the numeral 10. In general, the ice fishing hole cover and indicator 10 includes a base 12 having a pole engagement end 14 and an ice hole cover end 16, an indicator cover 18, a trip latch 20, a catch 22, and an actuator 24.

The base 12 is preferably elongate and may be suitably formed of blow molded plastic. The base 12 generally includes a pole engagement end 14, an ice hole cover end 16, and an intermediate section 26, extending between the pole engagement end 14 and the ice hole cover end 16. (FIG. 1)

As may be seen in FIG. 2, the pole engagement end 14 preferably includes a pole cup 28 which may be circular in shape and adapted for receiving engagement of the handle 30 of an ice fishing pole 32 which may preferably include a fishing reel 34 having fishing line 36. The pole cup 28 may be adapted for holding the ice fishing pole 32 in a substantially vertical orientation or may be slightly angled for engaging the handle 30 such that the ice fishing pole 32 is held vertically at a slight angle relative to perpendicular with respect to the base 12. Alternatively, the pole cup 28 may be of slightly larger diameter than the handle 30 which, in turn, permits the ice fishing pole 32 to be held at a slight angle relative to perpendicular with respect to the base 12. It should be noted that the pole cup 28 may be integral to the pole engagement end 14 or may be fixedly secured thereto at the discretion of an individual.

The intermediate section 26 preferably extends from the pole engagement end 14 to the ice hole cover end 16. The intermediate section 26 is preferably elongate and may include any length dimension as preferred by an individual. Preferably, the intermediate section 26 has a length dimension in excess of six inches and includes an increasing width dimension, where the intermediate section 26 has the narrowest width dimension proximate to the pole engagement end 14 and the largest width dimension proximate to the ice hole cover end 16. The purpose of the intermediate section 26 is to provide rigid structural strength to the ice fishing hole cover and indicator 10.

Figure 9:
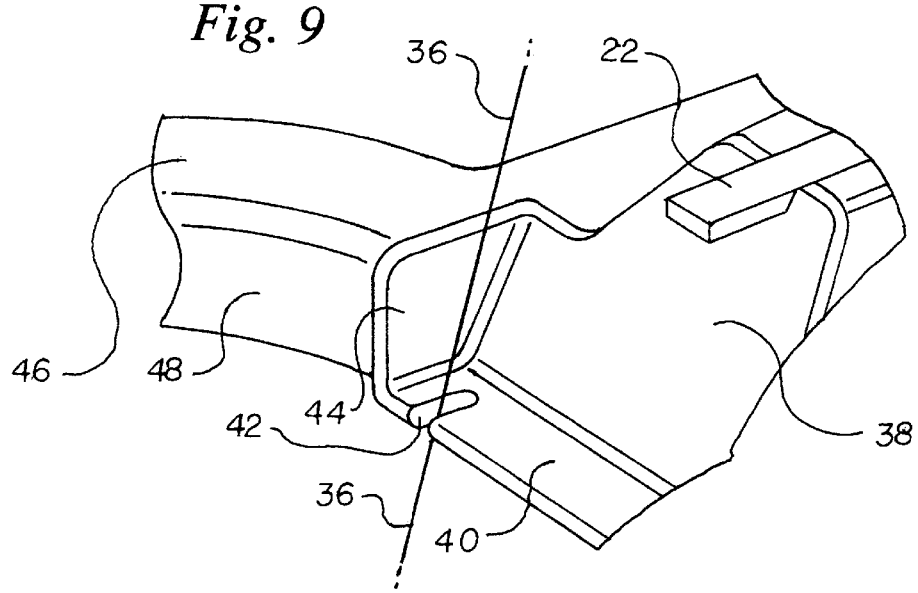
FIG. 9 is a detail view of the ice hole cover end of the base showing the catch, sloped edge, and fishing line positioned in the line slot.

As may be seen in FIG. 9, a sloped ledge 38 is provided in the transition area between the intermediate section 26 and the ice hole cover end 16. A horizontal ledge 40 is preferably provided, extending forwardly from the sloped ledge 38 toward the interior of the ice hole cover end 16. A line slot 42 is preferably provided in the horizontal ledge 40 proximate to the sidewall 44 of the ice hole cover end 16. Preferably, the angular relationship between the horizontal ledge 40 and sloped ledge 38 establishes an obtuse angle between 90° and 175°.

As may be seen in FIG. 9, the catch 22 preferably is integral or affixed to the intermediate section 26 and extends forwardly therefrom over the sloped ledge 38 toward the ice hole cover end 16. The catch 22 may be rectangular, square, cylindrical, oval, or any other shape as preferred by an individual provided that the essential functions, features, and attributes described herein are not sacrificed. The catch 22 may be preferably formed of the same material as the base 12 or alternatively may be formed of metal, aluminum, or rigid wood material as preferred by an individual provided that the catch 22 is preferably of sufficient strength and durability to not fracture or fail during use of the ice hole fishing cover and indicator 10.

As may be seen in FIGS. 1, 2, 9, and 10, the ice hole cover end 16 is preferably positioned opposite to the pole engagement end 14 of the ice fishing hole cover and indicator 10. The ice hole cover end 16 is preferably sized to substantially cover an ice fishing hole which may be placed in a frozen ice surface. The ice hole cover end 16 preferably includes a lip 46 and an interior edge wall 48 which defines an interior for the ice hole cover end 16 immediately above a hole in the ice used for fishing activities. The ice hole cover end 16 may be preferably round, square, oval, or rectangular, or may be any other shape as preferred by an individual, provided that the essential functions, features, and attributes described herein are not sacrificed.

The ice hole cover end 16 preferably includes a mounting bracket indicated, in general, by the numeral 50. The mounting bracket 50 may be formed of a pair of receiving tabs 52 which may include aligned apertures therethrough.

Alternatively, the mounting bracket 50 may be a hinge or a spring-loaded hinge or any other means for mounting which provides for pivotal engagement of the indicator cover 18 to the ice hole cover end 16 for the covering of an ice fishing hole.

As seen in FIGS. 1 and 2, the pole engagement end 14, ice hole cover end 16, and intermediate section 26 are provided in substantially the same horizontal plane for continuous and flush engagement to an ice surface. Alternatively, the intermediate section 26 may be recessed whereupon the pole engagement end 14 and the ice hole cover ends 16 may be in substantially the same plane for engagement and placement upon an ice surface. In addition, the pole engagement end 14, ice hole cover end 16, and/or intermediate section 26 may include a plurality of grippers which may be used to assist in the retention of the ice fishing hole cover and indicator 10 in a desired location upon an ice surface.

The base 12 may be formed of any suitable rigid material, including plastic, wood, and/or metal, at the discretion of an individual, provided that the essential functions, features, and attributes described herein are not sacrificed. The base 12 may be colored as desired by an individual for improving the visibility of the ice fishing hole cover and indicator 10 during ice fishing activities.

As may be seen in FIGS. 1 and 2, an indicator cover 18 is preferably provided for seated pivotal engagement within the ice hole cover end 16. The indicator cover 18 is preferably shaped for mating engagement to the shape of the ice hole cover end 16 and is adapted to cover and enclose a hole in the ice during ice fishing activities. The indicator cover 18 preferably functions to delay and postpone the freezing of a hole placed in ice, thereby prolonging the ability for ice fishing activities, as opposed to permitting an ice fishing hole to be exposed to the natural weather conditions.

The indicator cover 18 preferably includes an affixation member which may be indicated, in general, by the numeral 54. The affixation member 54 may be formed of a pair of mounting tabs 56 which may include aligned apertures which are adapted for further alignment and pivotal attachment to the receiving tabs 52 or mounting bracket 50 to permit pivotal rotation of the indicator cover 18 relative to the ice hole cover end 16. The mounting tabs 56 may be preferably engaged to the receiving tabs 52 through the use of pins, and/or bolts and nuts, as preferred by an individual, provided that the essential functions, features, and attributes described herein are not sacrificed.

As may be seen in FIG. 2, the indicator cover 18 preferably includes a first ledge 58 and a wall 60. The first ledge 58 is preferably adapted for positioning for flush engagement to the lip 46 of the ice hole cover end 16. The wall 60 is preferably adapted for positioning interior to and adjacent the interior edge wall 48 of the ice hole cover end 16. The seated mating engagement between the indicator cover 18 and ice hole cover end 16 is thereby provided. Alternatively, the feature of the wall 60 may be eliminated whereupon the indicator cover 18, having the first ledge 58, covers the lip 46 of the ice hole cover end 16.

Figure 3:
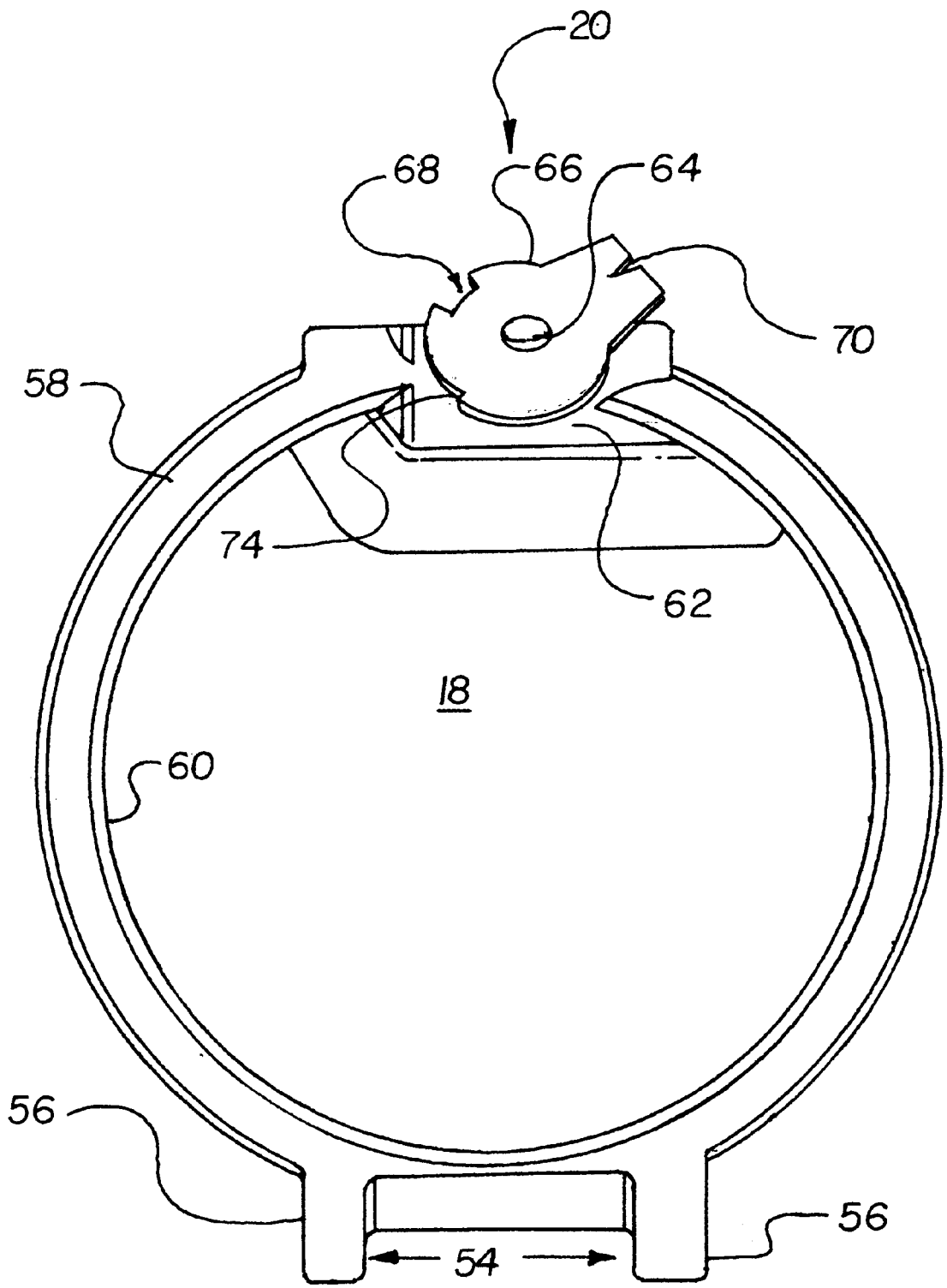
FIG. 3 is a detail bottom view of the indicator cover.
Figure 5:
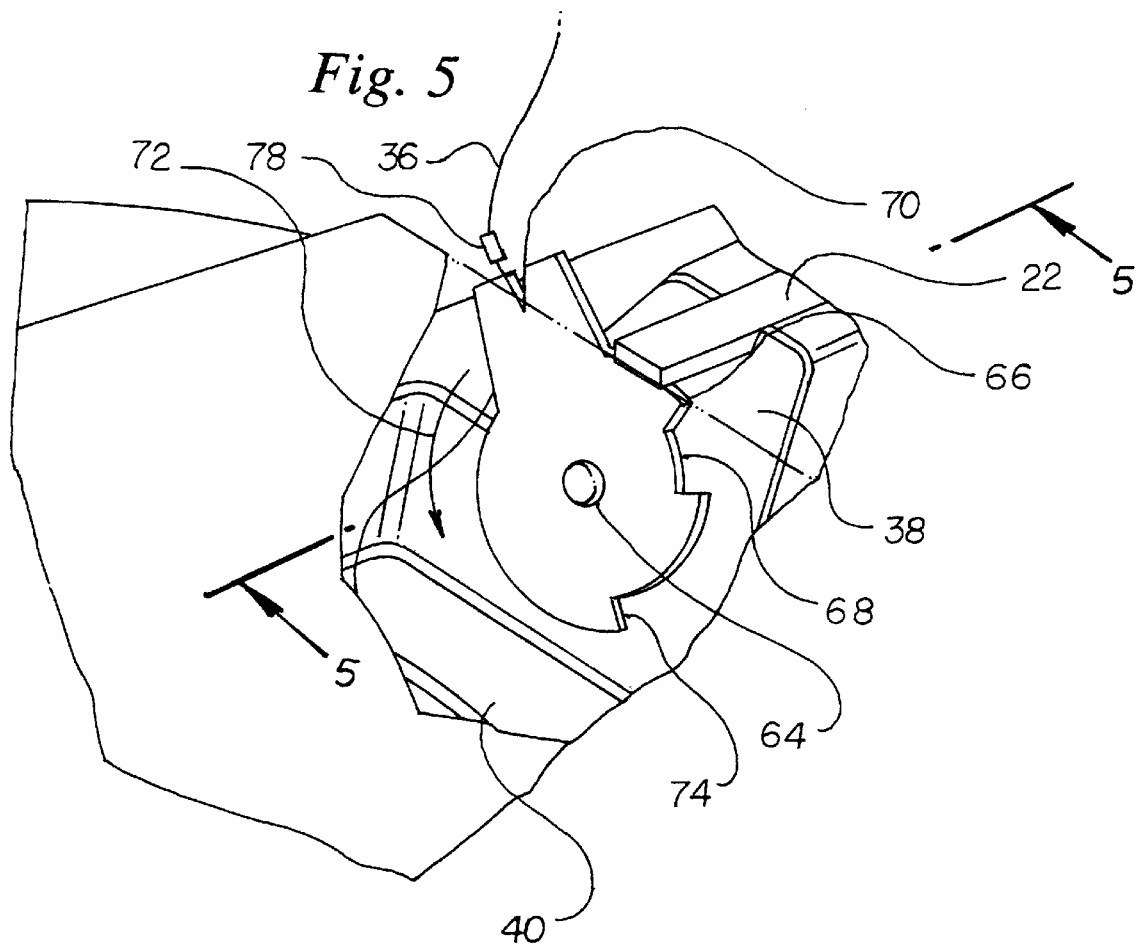
FIG. 5 is a partial cutaway detail view of the trip latch and catch.
Figure 6:
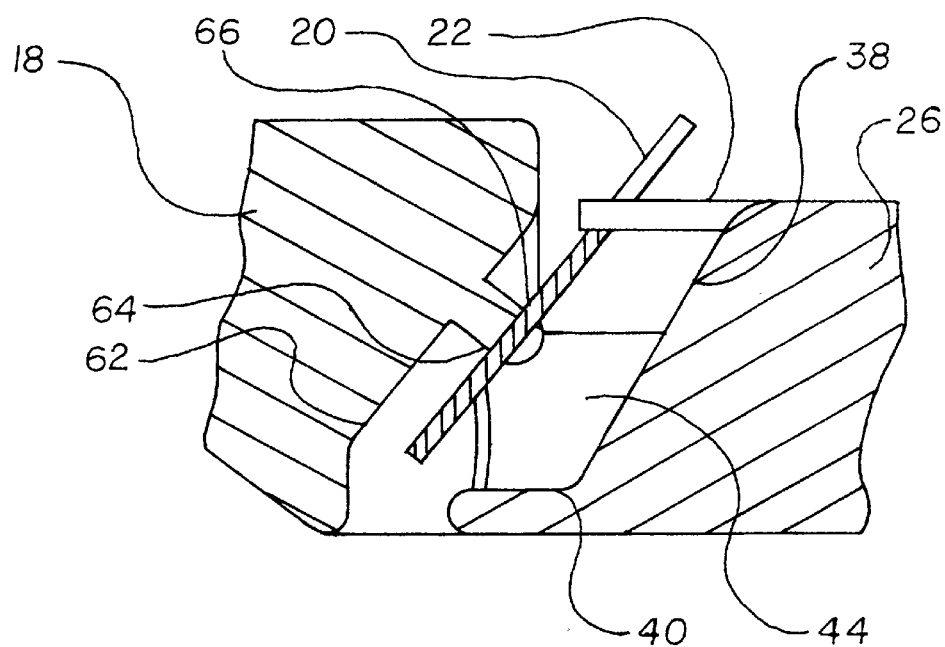
FIG. 6 is a cross-sectional side view of the trip latch and catch taken along the line 5—5 of FIG. 5.
Figure 7:
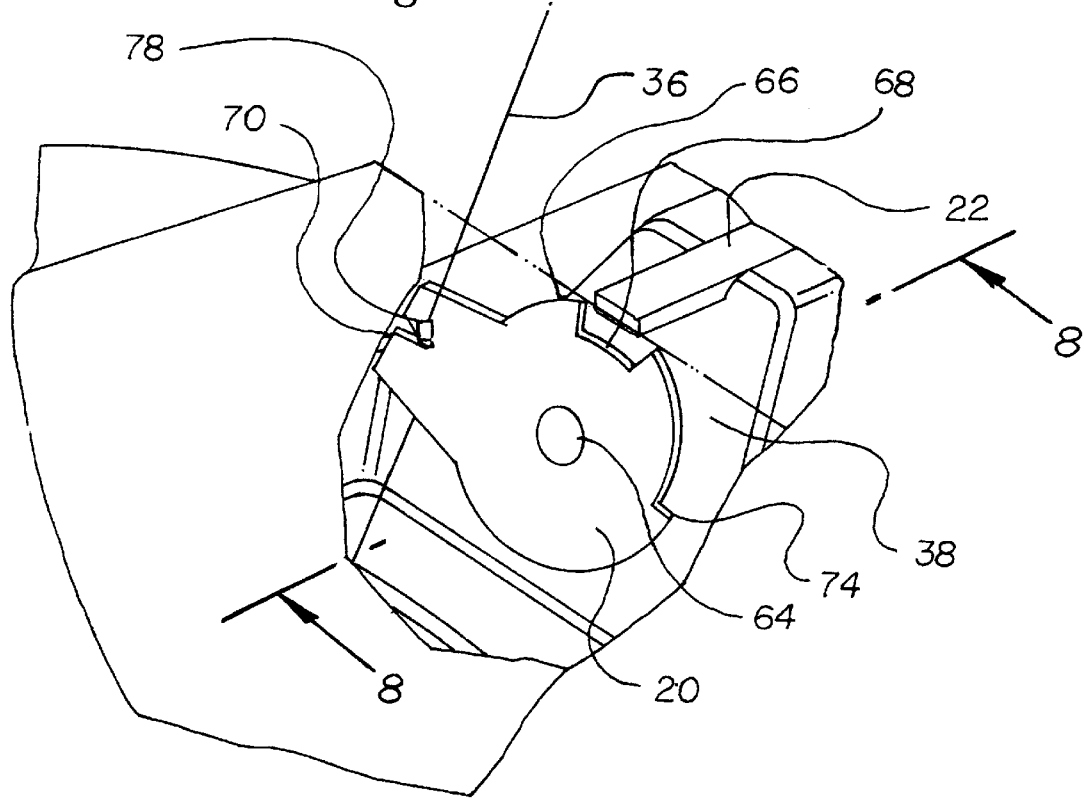
FIG. 7 is a partial cutaway detail view of the trip latch and catch.
Figure 8:
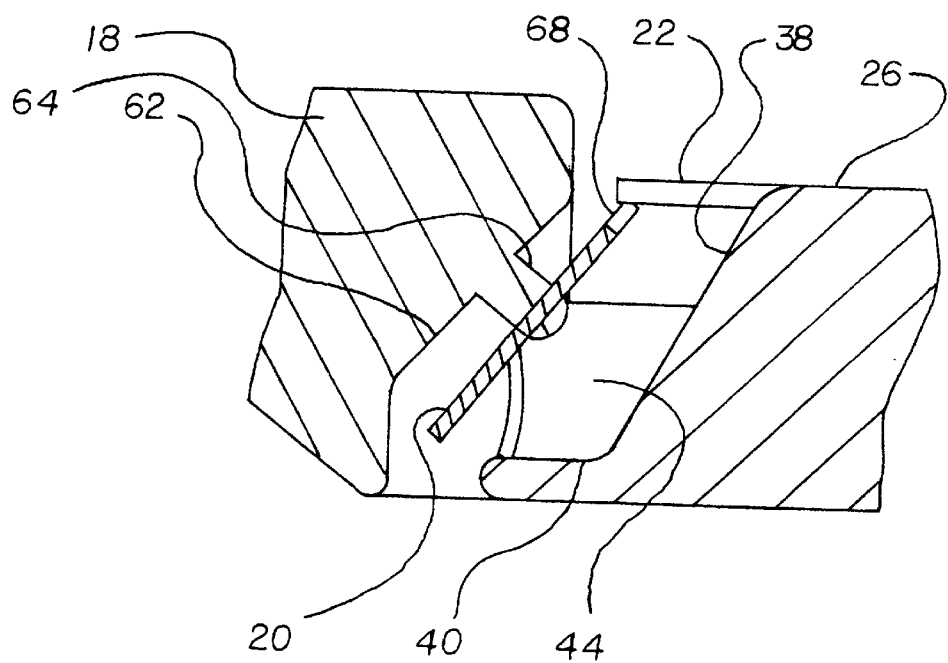
FIG. 8 is a cross-sectional side view of the trip latch and catch taken along the line of 8—8 of FIG. 7.

As may be seen in FIGS. 3, 6, and 8, the indicator cover 18 preferably includes a second sloped ledge 62. The second sloped ledge 62 is preferably separated from the sloped ledge 38 and may be substantially parallel thereto. The second sloped ledge 62 preferably includes a fastener 64 which positions the trip latch 20 at an angle relative to the ice hole cover end 16. The second sloped ledge 62 preferably positions the trip latch 20 in a plane substantially parallel to the sloped ledge 38 for engagement to the catch 22. It should be noted that the second sloped ledge 62 is preferably sufficiently spaced from the sloped ledge 38 to position the trip latch 20 for engagement to the catch 22. It should be noted that the engagement between the first ledge 58 and the lip 46 limits and restricts the positioning of the indicator cover 18 relative to the ice hole cover end 16, further preventing the engagement between the second sloped ledge 62 and the sloped ledge 38 during use of the ice fishing hole cover and indicator 10.

The indicator cover 18 may be preferably colored as desired by an individual, in order to facilitate observation during ice fishing activities. In operation, the indicator cover 18, as pivotally engaged to the ice hole cover end 16, elevates following the taking of bait to indicate the presence of a fish on the fishing line 36. It is therefore desirable for the indicator cover 18 to be colored for ease of observation by an ice fisherman during ice fishing activities. It should be noted that the indicator cover 18 may be formed of the same material as the base 12 or may be formed of any other suitably lightweight and rigid material as preferred by an individual provided that the essential functions, features, and attributes described herein are not sacrificed. In addition, the indicator cover 18 may include insulating materials to further postpone the refreezing of an ice fishing hole over an extended period of time.

As depicted in FIGS. 3, 5, 6, 7, and 8, the trip latch 20 is preferably engaged to the second sloped ledge 62 via the fastener 64. The trip latch 20 is preferably designed for releasable engagement to the catch 22. The trip latch 20 preferably includes a catch engagement ledge 66 which is adapted to engage the catch 22, defining a first closed position where the indicator cover 18 is adjacent to the ice hole cover end 16. The trip latch 20 also includes a release slot 68 which permits disengagement of the catch 22 from the trip latch 20, permitting the indicator cover 18 to acquire a second operative opened position where the indicator cover 18 is positioned substantially vertically and perpendicularly above the ice hole cover end 16, signaling the presence of a fish on the fishing line 36.

The trip latch 20 is preferably rotatably engaged to the second sloped ledge 62 via the fastener 64. The trip latch 20 preferably includes a line engagement slit 70 which is preferably adapted to engage the fishing line 36 for rotation of the trip latch 20 in the direction of arrow 72, for positioning of the release slot 68 into alignment with the catch 22 for release of the indicator cover 18 from the ice hole cover end 16 following the striking of a fish. The trip latch 20 also includes a stop ledge 74 which is adapted to limit the rotation of the trip latch 20 about the fastener 64 for positioning of the line engagement slit 70 in a position substantially vertically below the fastener 64 for release of the fishing line 36 following the striking of a fish, and the pivotal elevation of the indicator cover 18 into the second opened operative position.

Figure 10:
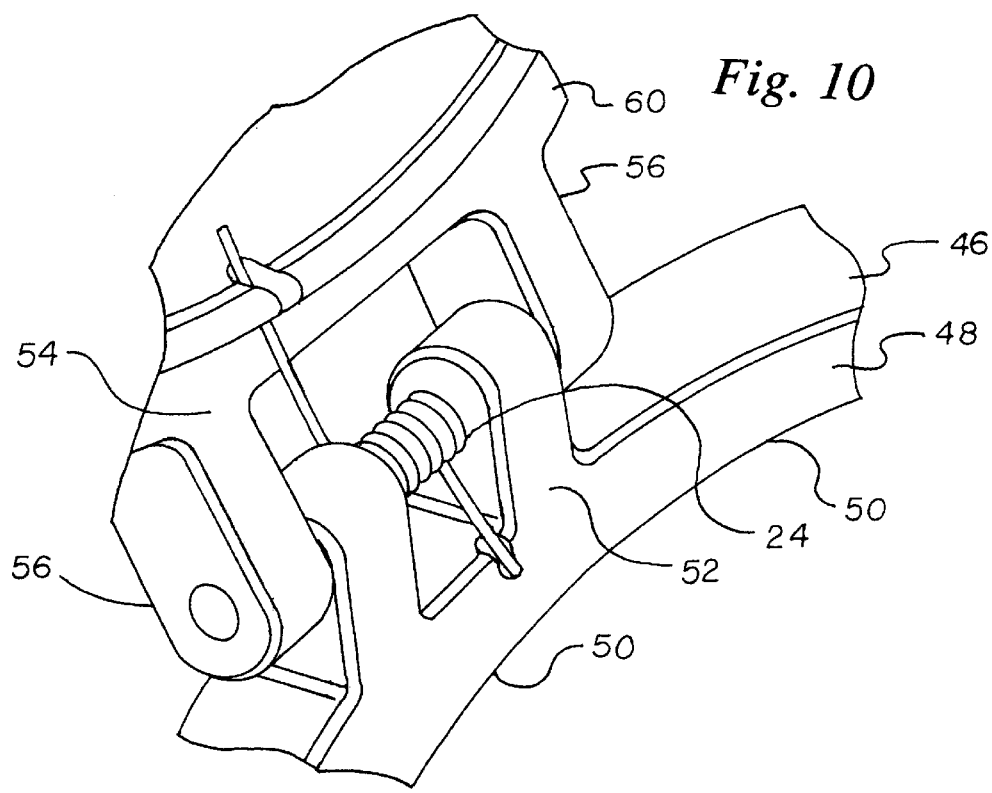
FIG. 10 is a detail view of one embodiment where the actuator is engaged to the indicator cover and ice hole cover end of the base.

As may be seen in FIG. 10, the actuator 24 is preferably engaged to the ice hole cover end 16 and to the indicator cover 18. In addition, the actuator 24 may be engaged to the mounting tabs 56 and to the receiving tabs 52 for pivotal elevation of the indicator cover 18 relative to the ice hole cover end 16, as depicted by arrow 76 of FIG. 1, upon the release of the trip latch 20 from the catch 22. The actuator 24 preferably urges the indicator cover 18 upwardly from the ice hole cover end 16 to the vertical second opened operative position upon the striking of the fishing line 36 by a fish, and the release of the trip latch 20 from the catch 22. The actuator 24 may be formed of a torsion spring, spring latch, or any other preferred spring mechanism as desired by an individual, provided that the essential functions, features, and attributes described herein are not sacrificed.

In operation, a fisherman will initially drill a hole in ice to initiate fishing activities. The fisherman will then position the ice hole cover end 16 over the ice hole. Once the ice hole cover end 16 is positioned over an ice fishing hole, a fisherman may establish the depth for the bait in a conventional manner, placing a bobber stop 78, sinker, or knot in the fishing line for presentation of the bait at a desired depth. The fisherman may then open the bail of the fishing reel 34 and position the handle 30 of the ice fishing pole 32 in the pole cup 28. The fishing line 36 may then be positioned in the line slot 42. The individual may then grasp the indicator cover 18, moving the indicator cover 18 downward toward the ice hole cover end 16 for positioning of the first ledge 58 adjacent to the lip 46 thereby fitting the wall 60 within the interior edge wall 48. The downward movement of the indicator cover 18 compresses the actuator 24 for release upon the striking of a fish. The individual may then rotate the trip latch 20 about the fastener 64 for alignment of the release slot 68 with the catch 22, permitting the indicator cover 18 to be pressed downwardly past the catch 22. The individual then rotates the trip latch 20 for engagement of the catch engagement ledge 66 with the catch 22 for a desired distance for setting of the tension of the trip latch for triggering following the strike of either a larger or smaller fish. The individual may then release his grasp of the indicator cover 18, allowing the actuator 24 to slightly elevate the indicator cover 18 for engagement of the catch engagement ledge 66 of the trip latch 20 to the catch 22. The individual may then check to ensure that the bail of the fishing reel 34 is open, whereupon the individual may then insert the fishing line 36 within the line slit 70 with the bobber stop 78 being positioned above or upstream of the trip latch 20. The ice fishing hole cover and indicator 10 is then set for use. It should be noted that the fishing line 36 extends upwardly from the ice fishing hole through the line slot 42 to a position underneath the trip latch 20 for passing upwardly through the line slit 70 whereupon the bobber stop 78 is positioned upstream or above the line slit 70. The ice fishing hole cover and indicator 10 thereby enables a fisherman to use conventional ice fishing poles 32 and reels 34 which further enables a fisherman to select a lighter weight of fishing line 36 than would otherwise be available due to the desired action for the pole 32 and drag features for the reel 34.

It should be noted that the second sloped ledge 62, positioned above and substantially parallel to the sloped ledge 38, ensures that the only engagement between the indicator cover 18 and the ice hole cover end 16 occurs via the engagement between the catch engagement ledge 66 and the catch 22. The indicator cover 18 is thereby permitted to freely elevate from the ice hole cover end 16 upon the striking of a fish. When the ice fishing hole cover and indicator 10 is set, a fisherman is permitted to grasp the fishing line 36 and jig the fishing line without release or resetting of the trip latch 20 as engaged to the catch 22. By grasping the fishing line 36 upstream of the trip latch 20, a fisherman is able to slide the fishing line 36 freely within the line slit 70 and line slot 42. It should be noted that the trip latch 20 only rotates for alignment of the release slot 68 to the catch 22 when the fishing line 36 is drawn downwardly via the engagement between the bobber stop 78 and the trip latch 20. The downward drawing of the fish line 36 results in the rotation of the trip latch 20 about the fastener 64 for release with respect to the catch 22, permitting the indicator cover 18 to rise vertically to signal the presence of a fish on the fishing line. The pulling of the fishing line 36 upwardly does not rotate the trip latch 20 for disengagement of the catch engagement ledge 66 from the catch 22. Therefore, a fisherman is permitted to jig fishing bait in a normal manner without resetting of the ice fishing hole cover and indicator 10.

When a fish takes the bait and hook as attached to the fishing line 36, the fish will draw the fishing line 36, causing the bobber stop 78 to engage the trip latch 20 proximate to the line engagement slit 70. The trip latch 20 will then rotate downwardly about the fastener 64, as indicated by the arrow 72 of FIG. 4, aligning the release slot 68 to the catch 22, permitting disengagement of the indicator cover 18 from the ice hole cover end 16. It should be noted that the initial release tension selected by a fisherman for the trip latch 20 may be selected for larger or smaller fish by selecting the position of the catch 22 relative to the catch engagement ledge 66. For example, placing the catch 22 proximate to the release slot 68 along the catch engagement ledge 66 establishes a relatively small distance for rotation of the trip latch 20 which would be desirable when fishing for smaller fish. Alternatively, when fishing for larger fish, the catch 22 may be positioned a further distance from the release slot 68 along the catch engagement ledge 66, requiring that the downward force exerted on the fishing line 36 to be increased for positioning of the release slot 68 into alignment with the catch 22.

Upon alignment of the release slot 68 to the catch 22, the actuator 24, which is under tension at the set position, releases, permitting the indicator cover 18, which is positioned in the first closed position, to rotate vertically upwardly to a position substantially perpendicular to the ice hole cover end 16. The fishing line 36 may continue to be drawn downwardly, causing the trip latch 20 to further rotate until the stop ledge 74 is proximate to the fastener 64. In this position, the line slit 70 is preferably aligned and vertically below the fastener 64 whereupon the fishing line 36 will drop or separate from the line slit 70. The fishing line 36 may or may not continue to be positioned in the line slot 42 of the horizontal ledge 40. In either event, the fishing line 36 may continue to be freely drawn by a fish due to the open bail of the fishing reel, which minimizes resistance on the bait, increasing the likelihood of catching a fish. The elevation of the indicator cover 18 to the second open operative position signals a fisherman as to the existence of a fish on the fishing line 36. The fisherman is then able to pick up the fishing pole 32 and fishing reel 34 combination, close the bail on the reel 34, set the hook, and catch the fish in a conventional manner, utilizing the advantages of the reel drag and desired action of the fishing rod 32. The fisherman is therefore provided with the ability to use a lighter weight of line 36 than would otherwise be available for use with conventional tip-up devices.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. I claim an ice fishing hole cover and indicator comprising:

(a) a base having a pole engagement end adapted to hold an ice fishing pole having fishing line, said base further having a catch and an ice hole cover end adapted to cover a hole in ice;

(b) an indicator cover having an affixation member adapted to pivotally engage said ice hole cover end;

(c) a trip latch engaged to said indicator cover, said trip latch adapted for releasable engagement to said catch, said latch having a line slit adapted to releasably hold said fishing line; and (d) an actuator engaged to said ice hole cover end and said indicator cover, said actuator urging said indicator cover from said ice hole cover end upon the release of said trip latch from said catch.

2. I claim the ice fishing hole cover and indicator of claim 1, said pole engagement end comprising a pole cup.

3. I claim the ice fishing hole cover and indicator of claim 2, said pole engagement end adapted to hold said ice fishing pole in a substantially vertical orientation.

4. I claim the ice fishing hole cover and indicator of claim 3, said base further comprising a sloped ledge, said catch extending horizontally outward from and above said sloped ledge toward said ice hole cover end.

5. I claim the ice fishing hole cover and indicator of claim 4, said ice hole cover end further comprising a mounting bracket adapted for engagement to said affixation member for the provision of pivotal rotation of said indicator cover relative to said ice hole cover end.

6. I claim the ice fishing hole cover and indicator of claim 5, said indicator cover comprising a fastener.

7. I claim the ice fishing hole cover and indicator of claim 6, said trip latch further comprising a catch engagement ledge adapted to engage said catch defining a first closed position wherein said indicator cover is adjacent to said ice hole cover end, a release slot adapted to permit disengagement of said catch from said trip latch permitting said indicator cover to acquire a second operative position where said indicator cover is positioned substantially vertical and perpendicular with respect to said ice hole cover end, said trip latch being rotatably engaged to said fastener.

8. I claim the ice fishing hole cover and indicator of claim 7, said actuator comprising a spring.

9. I claim an ice fishing hole cover and indicator comprising:

(a) a base having a pole engagement end having a pole cup adapted to hold an ice fishing pole having fishing line, said base further having a sloped ledge, a horizontal ledge having a line slot, and a catch extending horizontally outward from said base above said sloped ledge, said base further having an ice hole cover end sized to substantially cover a hole in ice, said ice hole cover end having a lip, an interior edge defining an interior, and a mounting bracket;

(b) an indicator cover having a wall adapted for positioning adjacent to said interior edge within said interior, and a first ledge adapted for positioning adjacent to said lip; said indicator cover further having an affixation member adapted to engage said mounting bracket and provide pivotal rotation of said indicator cover relative to said ice hole cover end, said indicator cover further having a second sloped ledge adapted for substantially parallel positioning relative to said sloped ledge, said indicator cover further having a fastener proximate to said second sloped ledge;

(c) a trip latch rotatably engaged to said fastener, said trip latch having a line engagement slit adapted to engage said fishing line, a catch engagement ledge adapted to engage said catch defining a first closed position where said indicator cover is adjacent to said ice hole cover end, said trip latch further having a release slot adapted to permit disengagement of said catch from said trip latch permitting said indicator cover to acquire a second operative position where said indicator cover is positioned substantially vertical and perpendicular with respect to said ice hole cover end; and (d) an actuator engaged to said ice hole cover end and to said indicator cover, said actuator urging said indicator cover into said second operative position upon the release of said catch from said trip latch.

10. I claim the ice fishing hole cover and indicator of claim 9 wherein said fishing line has a stop positioned upstream from said trip latch.

11. I claim the ice fishing hole cover and indicator of claim 10 wherein the positioning of said sloped ledge relative to said horizontal ledge defines an obtuse angle.

12. I claim the ice fishing hole cover and indicator of claim 11 wherein said fishing line is slidably positioned in said line engagement slit.

13. I claim the ice fishing hole cover and indicator of claim 12 wherein said pole engagement end and said ice hole cover end are in the same plane.

14. I claim the ice fishing hole cover and indicator of claim 13, said mounting bracket comprising a pair of receiving tabs having aligned apertures therethrough.

15. I claim the ice fishing hole cover and indicator of claim 13, said mounting bracket comprising a hinge.

16. I claim the ice fishing hole cover and indicator of claim 14, said affixation member comprising a pair of mounting tabs having aligned apertures therethrough adapted for pivotal attachment to said receiving tabs.

17. I claim the ice fishing hole cover and indicator of claim 16, said trip latch further comprising a stop ledge adapted for limiting rotation of said trip latch when said line engagement slit is positioned vertically below said fastener for release of said fishing line.

18. I claim the ice fishing hole cover and indicator of claim 17, said actuator comprising a spring.

* * * * *